US010296241B2

(12) United States Patent
Hioka et al.

(10) Patent No.: US 10,296,241 B2
(45) Date of Patent: May 21, 2019

(54) CONTROL DEVICE, CONTROL SYSTEM, CONTROL METHOD FOR CONTROL DEVICE, AND CONTROL METHOD FOR CONTROL SYSTEM

(71) Applicant: OMRON Corporation, Kyoto-shi, Kyoto (JP)

(72) Inventors: Takehiko Hioka, Otsu (JP); Yutaka Abe, Ritto (JP); Shinsuke Kawanoue, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/123,204

(22) PCT Filed: Jan. 15, 2015

(86) PCT No.: PCT/JP2015/050879
§ 371 (c)(1),
(2) Date: Sep. 1, 2016

(87) PCT Pub. No.: WO2015/136965
PCT Pub. Date: Sep. 17, 2015

(65) Prior Publication Data
US 2017/0212699 A1    Jul. 27, 2017

(30) Foreign Application Priority Data
Mar. 14, 2014 (JP) ................................. 2014-052680

(51) Int. Cl.
*G06F 12/00* (2006.01)
*G06F 3/06* (2006.01)
(Continued)

(52) U.S. Cl.
CPC .......... *G06F 3/0619* (2013.01); *G06F 3/0659* (2013.01); *G06F 3/0673* (2013.01);
(Continued)

(58) Field of Classification Search
CPC ... G06F 8/65; G06F 8/665; G06F 8/71; G06F 8/654; G06F 3/0619
See application file for complete search history.

(56) References Cited

U.S. PATENT DOCUMENTS 6,412,082 B1    6/2002  Matsuura
2003/0221096 A1  11/2003  Wada
(Continued)

FOREIGN PATENT DOCUMENTS

CN    102043614 A    5/2011
JP    2003-223617 A   8/2003
(Continued)

OTHER PUBLICATIONS

"Dell PowerEdge M1000e Chassis Management Controller Firmware Version 5.0 User's Guide", 2014, Dell Inc., p. 262.*
(Continued)

*Primary Examiner* — Arvind Talukdar
(74) *Attorney, Agent, or Firm* — MetroLexis Law Group, PLLC

(57) ABSTRACT

When user configuration data recorded in a recording medium is written into a PLC, the PLC determines, in accordance with a combination table stored in the recording medium, if a combination of the user configuration data and firmware already stored in the PLC is suitable. In addition, when firmware recorded in the recording medium is written into the PLC, the PLC determines, in accordance with the combination table stored in the recording medium, if a combination of the firmware and user configuration data already stored in the PLC is suitable.

16 Claims, 11 Drawing Sheets

(51) Int. Cl.
    *G06F 9/445*     (2018.01)
    *G06F 8/654*     (2018.01)

(52) U.S. Cl.
    CPC .......... *G06F 9/445* (2013.01); *G06F 9/44505* (2013.01); *G06F 8/654* (2018.02)

(56) References Cited

U.S. PATENT DOCUMENTS

| | | | |
|---|---|---|---|
| 2006/0253838 A1* | 11/2006 | Fujii | G06F 9/44505 717/124 |
| 2010/0169876 A1* | 7/2010 | Mann | G06F 8/65 717/170 |
| 2011/0083129 A1 | 4/2011 | Masaki | |
| 2014/0040875 A1* | 2/2014 | Bower, III | G06F 8/65 717/170 |
| 2014/0201726 A1* | 7/2014 | Asselin | G06F 8/71 717/170 |
| 2014/0344799 A1* | 11/2014 | Thodati | G06F 8/65 717/171 |

FOREIGN PATENT DOCUMENTS

| | | |
|---|---|---|
| JP | 2003-345617 A | 12/2003 |
| JP | 2007-094546 A | 4/2007 |
| JP | 2007-095107 A | 4/2007 |
| JP | 4029448 B2 | 1/2008 |
| JP | 2010-055279 A | 3/2010 |
| JP | 2012-212415 A | 11/2012 |

OTHER PUBLICATIONS

The Japanese Office Action dated Jan. 9, 2018 in a related Japanese patent application.
The Office Action dated Nov. 2, 2018 in a counterpart Chinese patent application.

* cited by examiner

<Relationship between system firmware and add-on firmware (Add-on A)>

| Version of system firmware | Version of available add-on firmware |
|---|---|
| V1.0 | Add-on_A V1.0 |
| V1.1 | Add-on_A V1.0<br>Add-on_B V1.0 |
| V1.2 | Add-on_A V1.1<br>Add-on_B V1.0 |
| V2.0 | Add-on_A V1.1<br>Add-on_B V1.0<br>Add-on_C V1.0 |
| V2.1 | Add-on_A V1.2<br>Add-on_B V1.1<br>Add-on_C V1.1 |

Fig. 9

<Relationship between system firmware and
user configuration data>

| Version of system firmware | Available user configuration data (for system) |
|---|---|
| V1.0 | User configuration data (System) for V1.0<br>User configuration data (System) for V1.1 |
| V1.1 | User configuration data (System) for V1.0<br>User configuration data (System) for V1.1 |
| V1.2 | User configuration data (System) for V1.0<br>User configuration data (System) for V1.1<br>User configuration data (System) for V1.2 |
| V2.0 | User configuration data (System) for V2.0 |
| V2.1 | User configuration data (System) for V2.0<br>User configuration data (System) for V2.1 |

Fig. 10

<Relationship between add-on firmware and
user configuration data>
(Add-on A and user configuration data for Add-on A)

| Version of add-on firmware (Add-on A) | Available user configuration data (for Add-on A) |
|---|---|
| V1.0 | User configuration data (Add-on_A) for V1.0 |
| V1.1 | User configuration data (Add-on_A) for V1.0<br>User configuration data (Add-on_A) for V1.1 |
| V2.0 | User configuration data (Add-on_A) for V2.0 |

CONTROL DEVICE, CONTROL SYSTEM, CONTROL METHOD FOR CONTROL DEVICE, AND CONTROL METHOD FOR CONTROL SYSTEM

TECHNICAL FIELD

The present invention relates to writing data into a control device.

BACKGROUND ART

In a factory automation (FA) system installed in a manufacturing site or similar sites in a production factory, a control device such as programmable logic controller (PLC) is used for controlling the system. The control device executes an arithmetic operation based on a control program to control the system. Various techniques have been proposed so far for downloading data including control programs for use in such a control device.

For example, Japanese Unexamined Patent Publication No. 2007-95107 (Patent Document 1) discloses a technique for setting a parameter per a unit of a control device. More specifically, when the parameter is downloaded from an information processing device to the control device, the information processing device compares a version of a device information definition file used for parameter setting with a version of the unit of the control device. Next, when both the versions match, or if the version of the unit is later, the information processing device executes a download for the control device. If the version of the unit is older, the information processing device prohibits downloading for the control device and shows an error.

In addition, Japanese Unexamined Patent Publication No. 2007-94546 (Patent Document 2) discloses a programming supporting device that causes a control device to download a control program and information additional to the control program. More specifically, when the programming supporting device causes the control device to download the control program and the additional information, if the control device is not able to store the additional information in terms of a memory capacity, the programming supporting device processes the additional information so that the additional information fits the memory capacity, and then the programming supporting device allows the control device to download the control program and the additional information.

PRIOR ART DOCUMENTS

Patent Documents

Patent Document 1: Japanese Unexamined Patent Publication No. 2007-95107
Patent Document 2: Japanese Unexamined Patent Publication No. 2007-94546

SUMMARY OF THE INVENTION

Problems to be Solved by the Invention

A control system is required to simply and promptly download a program or data into a control device. Since downloading such a program or data is often required when mass-producing the control device, or if a failure occurs in the control device.

When mass-producing the control device, for example, the program or data should be downloaded promptly in terms of an increased productivity in mass-production. In addition, to prevent a wrong program or data from being downloaded during mass-production, the program or data should be downloaded simply.

In addition, when a program or data is downloaded due to a failure occurred in a control device, the program or data should be download promptly to shorten a down time during which no production is carried out. In addition, downloading a program or data should be simple so that, in a manufacturing site, even an operator who is not yet highly skilled can securely download the program or data.

However, conventional control systems have not been fully simplified in terms of writing of data into a control device including downloading a program or data into the control device.

In view of the above actual circumstances, the present invention has been invented and has an object to simply and promptly write a program or data into a control device.

Means for Solving the Problem

According to an aspect, a control device is provided. The control device includes a reader for reading data from a portable recording medium, a storage device for storing data for use in control, and a processor for writing, into the storage device, the data recorded in the portable recording medium. The portable recording medium further records combination information identifying a combination of data types. The processor is configured to, when the combination information recorded in the portable recording medium includes a combination of a type of data to be stored in the storage device and a type of the data recorded in the portable recording medium, write, into the storage device, the data recorded in the portable recording medium. The processor is configured not to, when the combination information recorded in the portable recording medium does not include the combination of the type of data to be stored in the storage device and the type of the data recorded in the portable recording medium, write, into the storage device, the data recorded in the portable recording medium.

Preferably, the data stored in the storage device is a type or types of firmware for the control device. The data recorded in the portable recording medium is a type or types of setting data for use in control by the firmware. The combination information identifies a combination of the type or types of firmware and the type or types of setting data for use in control by the firmware.

Preferably, the data recorded in the portable recording medium is a type or types of firmware for the control device. The data stored in the storage device is a type or types of setting data for use in control by the firmware. The combination information identifies a combination of the type or types of firmware and the type or types of setting data for use in control by the firmware.

Preferably, the control device further includes a reporting unit for executing a reporting operation when the combination information recorded in the portable recording medium does not include the combination of the type of data to be stored in the storage device and the type of the data recorded in the portable recording medium.

According to another aspect, a control system including a control device and a support device for recording, into a portable recording medium, data to be written into the control device is provided. The support device includes a recorder for recording information into the portable recording medium and a controller for controlling an operation of the recorder. The controller is configured to cause the recorder to record, into the portable recording medium, data and combination information identifying a data type to be combined with a type of the data. The control device includes a reader for reading data from the portable recording medium, a storage device for storing data for use in controlling the control device, and a processor for writing, into the storage device, the data recorded in the portable recording medium. The processor writes, into the storage device, the data recorded in the portable recording medium when the combination information recorded in the portable recording medium includes a combination of a type of data to be stored in the storage device and a type of the data recorded in the portable recording medium. The processor is configured not to, when the combination information recorded in the portable recording medium does not include the combination of the type of data to be stored in the storage device and the type of the data recorded in the portable recording medium, write, into the storage device, the data recorded in the portable recording medium.

Preferably, the data stored in the storage device is a type or types of firmware for use in controlling the control device. The data recorded in the portable recording medium is a type or types of setting data for use in control by the firmware. The combination information identifies a combination of the type or types of firmware and the type or types of setting data for use in control by the firmware.

Preferably, the data stored in the storage device is a type or types of setting data for use in control by firmware. The combination information identifies a combination of the type or types of firmware and the type or types of setting data for use in control by the firmware.

Preferably, the control device further includes a reporting unit for executing a reporting operation when the combination information recorded in the portable recording medium does not include the combination of the type of data to be stored in the storage device and the type of the data recorded in the portable recording medium.

According to still another aspect, a control method for a control device is provided. The control method is executed by a processor of the control device including a reader for reading data from a portable recording medium and a storage device for storing data for use in control. The portable recording medium records the data and combination information identifying a combination of data types. The control method includes a step of determining if the combination information recorded in the portable recording medium includes a combination of a type of data to be stored in the storage device and a type of the data recorded in the portable recording medium, and a step of writing, into the storage device, the data recorded in the portable recording medium when the combination information recorded in the portable recording medium includes the combination of the type of data to be stored in the storage device and the type of the data recorded in the portable recording medium.

Preferably, the control method further includes a step of executing a report without writing, into the storage device, the data recorded in the portable recording medium when the combination information recorded in the portable recording medium does not include the combination of the type of data to be stored in the storage device and the type of the data recorded in the portable recording medium.

According to still another aspect, a control method for a control system is provided. The control system includes a control device and a support device for recording, into a portable recording medium, data to be written into the control device. The support device includes a recorder for recording information into the portable recording medium. The control method includes a step of allowing the support device to cause the recorder to record, into the portable recording medium, data and combination information identifying a data type to be combined with a type of the data. The control device includes a reader for reading data from the portable recording medium, and a storage device for storing data for use in controlling the control device. The control method includes a step of causing the control device to determine if the combination information recorded in the portable recording medium includes a combination of a type of data to be stored in the storage device and a type of the data recorded in the portable recording medium, and a step of causing the control device to write, into the storage device, the data recorded in the portable recording medium when the combination information recorded in the portable recording medium includes the combination of the type of data to be stored in the storage device and the type of the data recorded in the portable recording medium.

Preferably, the control method further includes a step of causing the control device to execute a report without writing, into the storage device, the data recorded in the portable recording medium when the combination information recorded in the portable recording medium does not include the combination of the type of data to be stored in the storage device and the type of the data recorded in the portable recording medium.

EFFECT OF THE INVENTION

According to the present invention, a control device can determine, in accordance with combination information recorded in a recording medium, if data recorded in the recording medium should be written. Therefore, an operator attending writing data into the control device is not required to have knowledge on determining if the data should be written into the control device.

Accordingly, the data can be written into the control device in a simple manner. In addition, when data is written into the control device, an operator is not required to determine if the data should be written into the control device. That is, the control device can automatically write the data into the control device itself. Accordingly, the data can be written into the control device in a simple and prompt manner.

BRIEF DESCRIPTION OF THE DRAWINGS

FIG. 9 is a schematic view illustrating an example of information identifying a combination of system firmware and user configuration data.

FIG. 10 is a schematic view illustrating an example of information identifying a combination of add-on firmware and user configuration data.

MODE FOR CARRYING OUT THE INVENTION

Figure 1:
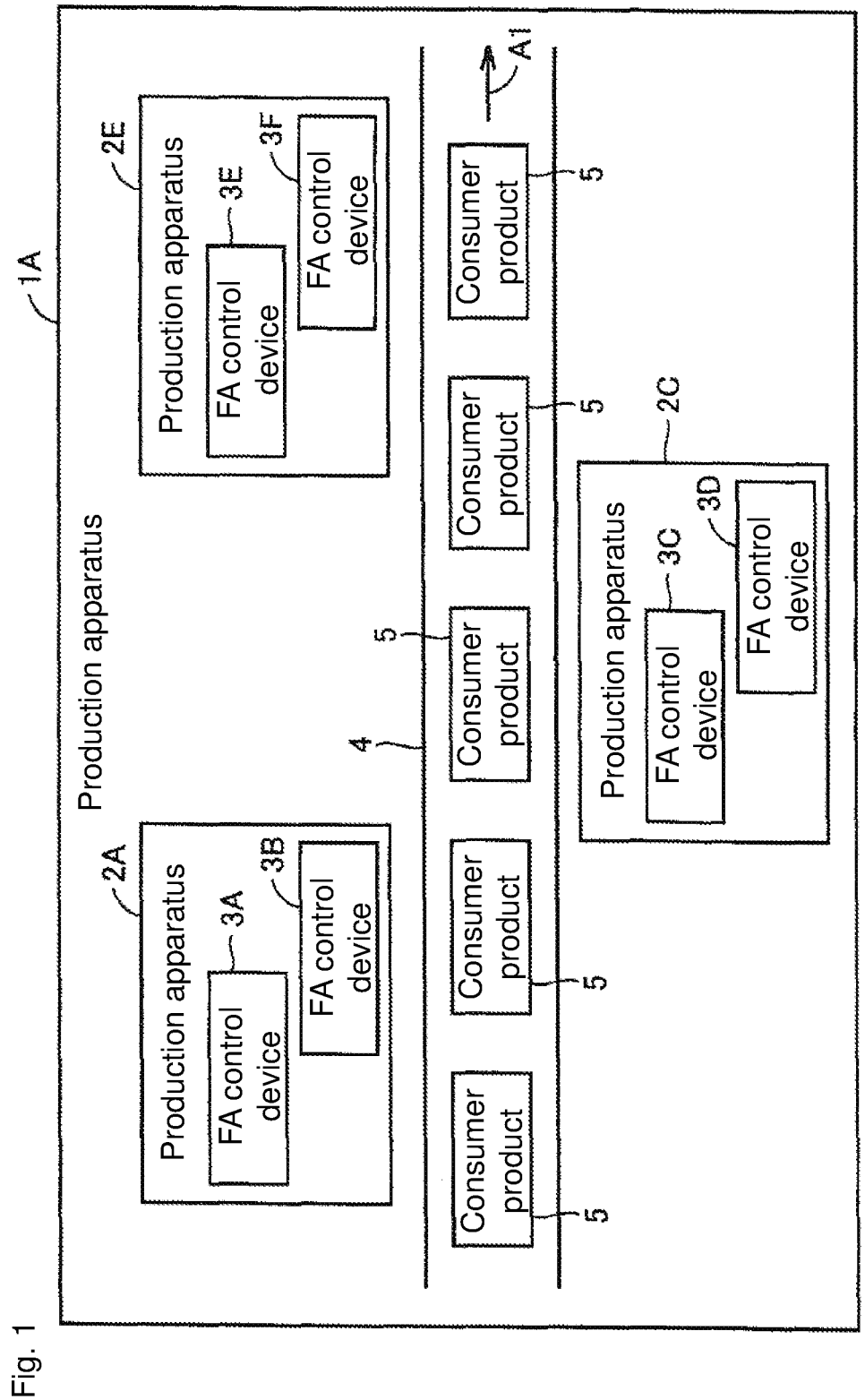
FIG. 1 is a view schematically illustrating an example configuration of a manufacturing site in which respective control systems according to four embodiments are used.

Control systems according to four embodiments of the present invention will now be described herein in detail with reference to drawings. More specifically, components common to all the embodiments will first be described, and then each of the embodiments will be described in detail. At this point, identical numerals and symbols apply to identical or equivalent components shown in the drawings so as not to repeat description of the components.

<Configuration of Manufacturing Site>

FIG. 1 is a view schematically illustrating an example configuration of a manufacturing site in which respective control systems according to four embodiments are used. With reference to FIG. 1, in a manufacturing site, each of consumer products 5 is processed in each of production apparatuses 2A, 2C, and 2E as the consumer products 5 flow on a conveyor 4 in a direction indicated by an arrow A1.

The consumer products 5 mean, for example, products produced in a factory. An example of the consumer products 5 includes a product for ordinary consumers, such as food product, pharmaceutical product, cloth, household product, home electric appliance, car, or smartphone. In addition, another example of the consumer products 5 includes a part used for a product for ordinary consumers, such as semiconductor part, liquid crystal panel, automobile part, and wood part.

The production apparatuses 2A, 2C, and 2E mean, apparatuses for producing consumer products. An example of the production apparatuses 2A, 2C, and 2E includes, for example, semiconductor production apparatus, tooling machine, wrapping machine, and press machine.

The production apparatuses 2A, 2C, and 2E are each mounted with an FA control device (hereinafter simply referred to as "control device") for controlling each of the production apparatuses. More specifically, the production apparatus 2A is mounted with control devices 3A and 3B. The production apparatus 2C is mounted with control devices 3C and 3D. The production apparatus 2E is mounted with control devices 3E and 3F. An example of the control devices 3A to 3F includes a PLC. In addition, the control devices 3A to 3F include in a broad sense indicators, sensors, servo motors, robots and other similar devices.

<Configuration of Control System>

Configuration of control systems according to the embodiments will now be described herein. Each of the embodiments will be described with a PLC, as a typical example of each of the control devices (control devices 3A to 3F shown in FIG. 1), for controlling target machines, facilities, and other equipment. However, a control device according to the present invention is not limited to a PLC, but can be applied to other various control devices.

Figure 2:
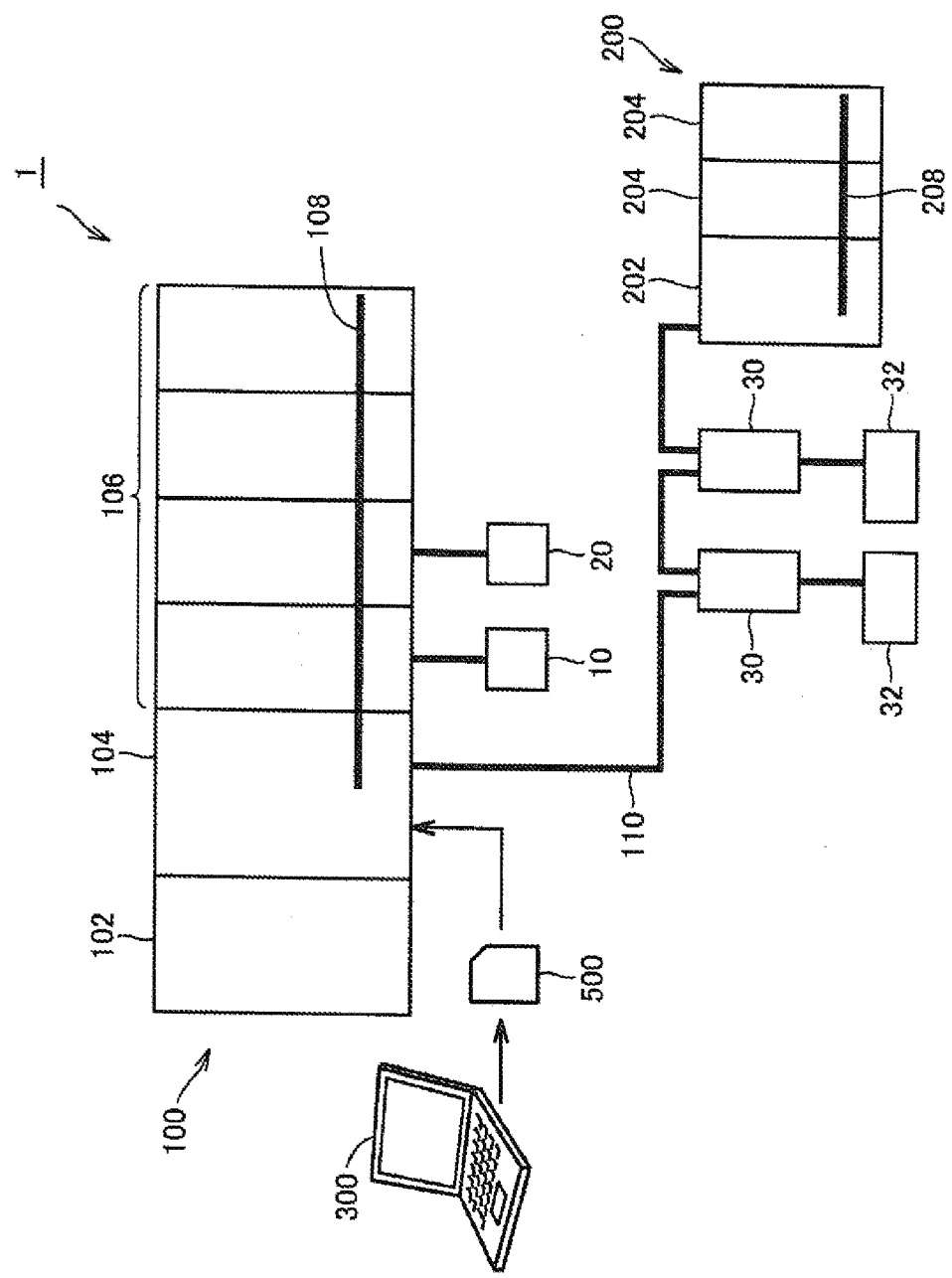
FIG. 2 is a schematic view illustrating a system configuration of a control system.

FIG. 2 is a schematic view illustrating a system configuration of a control system 1. With reference to FIG. 2, the control system 1 includes a PLC 100 and a support device 300.

The support device 300 sets various parameters, and performs programming, monitoring, debugging, and other tasks for programs to be executed in the PLC 100. The PLC 100 and the support device 300 are typically configured, in accordance with a Universal Serial Bus (USB) standard, to be able to communicate each other. At this point, the support device 300 records, into a portable recording medium (hereinafter simply referred to as "recording medium") 500 that is readable by the PLC 100, a program or data to be written into the PLC 100. Accordingly, even if the support device 300 cannot directly connect to the PLC 100, a program or data can be written into the PLC 100. The recording medium 500 is detachable, relative to the PLC 100 and the support device 300.

The PLC 100 includes a Central Processing Unit (CPU) unit 104 for executing a control arithmetic operation, and one or more Input/Output (IO) unit(s) 106. These units are configured to be able to exchange data via a PLC system bus 108. In addition, these units are supplied with power at a suitable voltage from a power supply unit 102.

In the control system 1, the PLC 100 exchanges data with various field devices via the IO unit(s) 106 (connected via the PLC system bus 108) and/or a field bus 110. Such field devices include actuators for executing some processes for the control-targets, and sensors for obtaining a variety of information from the control-targets.

FIG. 2 shows, as examples of such field devices, a detection switch 10, a relay 20, and servo motor drivers 30 for driving motors 32. In addition, the PLC 100 is connected with, via the field bus 110, a remote IO terminal 200. The remote IO terminal 200 basically executes ordinary input/output related processes, as same as the IO unit(s) 106. More specifically, the remote IO terminal 200 includes a communication coupler 202 for executing processes regarding data transmission via the field bus 110, and one or more IO unit(s) 204. These units are configured to exchange data each other via a remote IO terminal bus 208.

<Functional Configuration of PLC>

Figure 3:
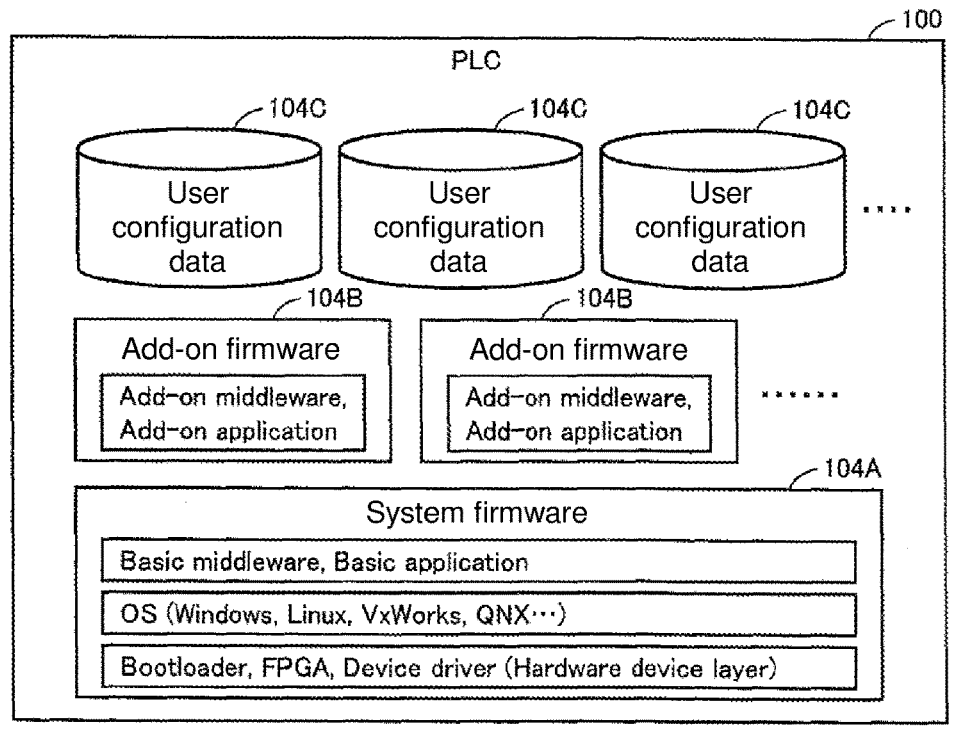
FIG. 3 is a view illustrating an example functional configuration of a PLC, an example control device.

FIG. 3 is a view illustrating an example functional configuration of a PLC, an example control device. The PLC 100 is installed with system firmware 104A and add-on firmware 104B. The system firmware 104A is software providing a basic functionality of the PLC 100. As shown in FIG. 3, the system firmware 104A includes software, such as "Basic middleware" and "Basic application," for achieving a basic functionality (program execution, communication, sensing, and other functions) of the control device. In addition, the system firmware 104A includes an Operating System (OS). In addition, the system firmware 104A includes software, such as "Bootloader," "FPGA," and "Device driver," for controlling hardware resources mounted on the control device, such as indication device, memory, and other devices of the control device.

The add-on firmware 104B is software for adding an application functionality to the control device. The application functionality is particular to a production apparatus in which a control device is mounted. Example functions include temperature control function and special communication function. In addition, different from the basic functionality of the control device, the application functionality is added by a control device manufacturer for higher competitiveness to achieve an expected, higher control device value. That is, the application functionality may differ depending on a control device, and, in addition, depending on a production apparatus onto which a control device is mounted.

The PLC 100 further includes user configuration data 104C. The user configuration data 104C is an example of setting data, and is data (a data group) for changing a setting of the PLC 100 or for customizing through programming. The user configuration data 104C for use in the PLC 100 includes data for customizing the system firmware 104A and data for customizing the add-on firmware 104B.

<Hardware Configuration of PLC>

Figure 4:
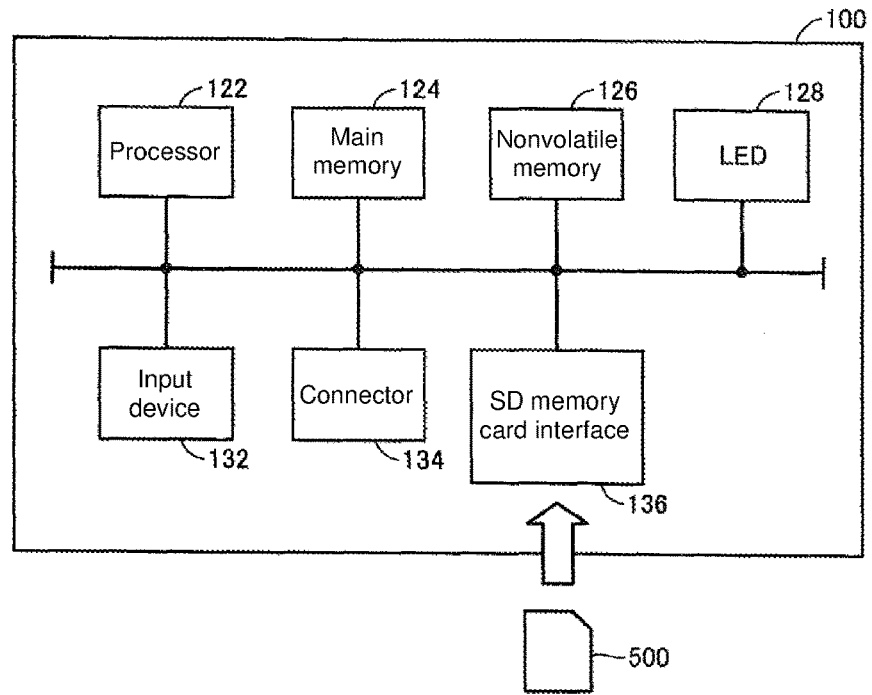
FIG. 4 is a view illustrating an example hardware configuration of a PLC.

FIG. 4 is a view illustrating an example hardware configuration of the PLC 100. As shown in FIG. 4, the PLC 100 includes a processor 122, a main memory 124, a nonvolatile memory 126, a Light Emitting Diode (LED) 128, an input device 132, a connector 134, and a Secure Data (SD) memory card interface 136.

The processor 122 controls an operation of the PLC 100 by executing a program stored in the nonvolatile memory 126 or other storage devices. The main memory 124 can be used as a work area for the processor 122. The nonvolatile memory 126 stores a variety of data such as programs. The LED 128 is an example reporting unit, and is controlled by the processor 122 for a lighting operation. The input device 132 accepts an external input of information, and is configured with, for example, a button. The connector 134 is provided to connect with an external device, such as a Universal Serial Bus (USB) memory. The SD memory card interface 136 reads information recorded in an SD memory card, an example of the recording medium 500.

<Hardware Configuration of Support Device 300>

Figure 5:
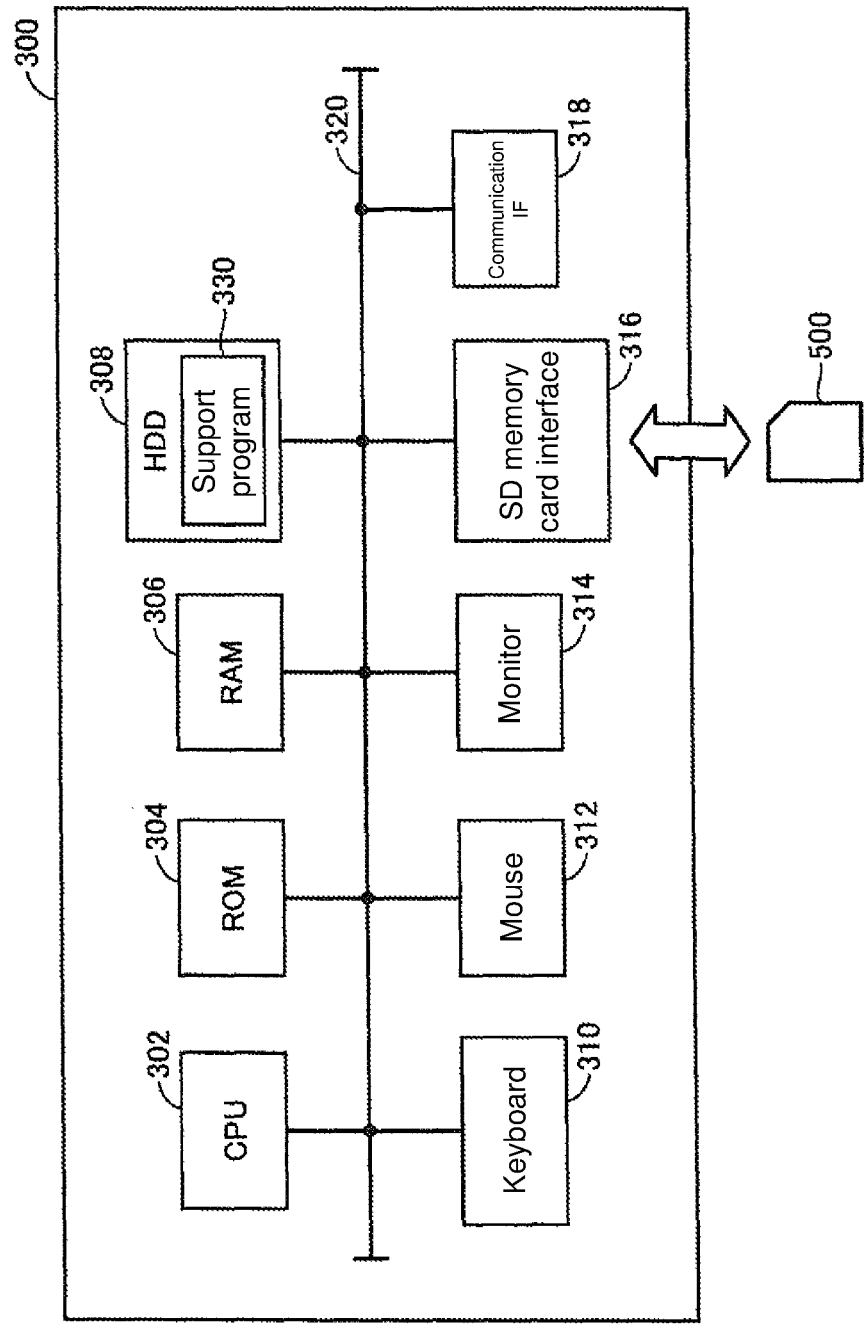
FIG. 5 is a view illustrating an example hardware configuration of a support device.

FIG. 5 is a view illustrating an example hardware configuration of the support device 300. As shown in FIG. 5, the support device 300 is configured typically with a general-purpose computer.

As shown in FIG. 5, the support device 300 includes a CPU 302 for executing various programs including the OS, a Read Only Memory (ROM) 304 for storing a BIOS and a variety of data, a Random Access Memory (RAM) 306 for providing a work area for storing data required to execute a program with the CPU 302, and a hard disk (HDD) 308 for storing in a non-volatile manner a program to be executed with the CPU 302. The control system 1 is configured with an example controller including the CPU 302 and the RAM 306.

The hard disk 308 stores a support program 330. The support program 330 includes an application program for use in the support device 300 to adjust a program to be executed in the PLC 100.

The support device 300 further includes a keyboard 310 and a mouse 312 for accepting operations by a user and a monitor 314 for presenting information to the user. In addition, the support device 300 includes an SD memory card interface 316 for reading data recorded in the recording medium 500, and for recording data into the recording medium 500. Further, the support device 300 includes a communication interface (IF) 318 for communicating with the PLC 100 (CPU unit 104) and other devices.

A program to be executed by the support device 300, such as the support program 330, can be stored in an optical recording medium for distribution. The program stored in the optical recording medium can be read by a drive device (not shown) dedicated for the optical recording medium, and then stored in the hard disk 308 or another storage device. Or, a configuration through which a program is written via a network from a higher host computer may be adopted.

In the embodiments, the hard disk 308 is an example storage device. In addition, the SD memory card interface 316 is an example recorder.

[First Embodiment]

In the control system described above, a program to be executed by the control device such as the PLC 100 includes firmware for the control device. In the control device, such firmware is largely divided into two types: system firmware and add-on firmware. The PLC 100 may write these programs via the recording medium 500. In a control system according to the first embodiment, the support device 300 records the above described two types of firmware into the recording medium 500 for use in the PLC 500. More specifically, the support device 300 records, into the recording medium 500, the above described two types of firmware with a predetermined combination. The control system according to the first embodiment will now be described herein.

<Functional Configuration>

Figure 6:
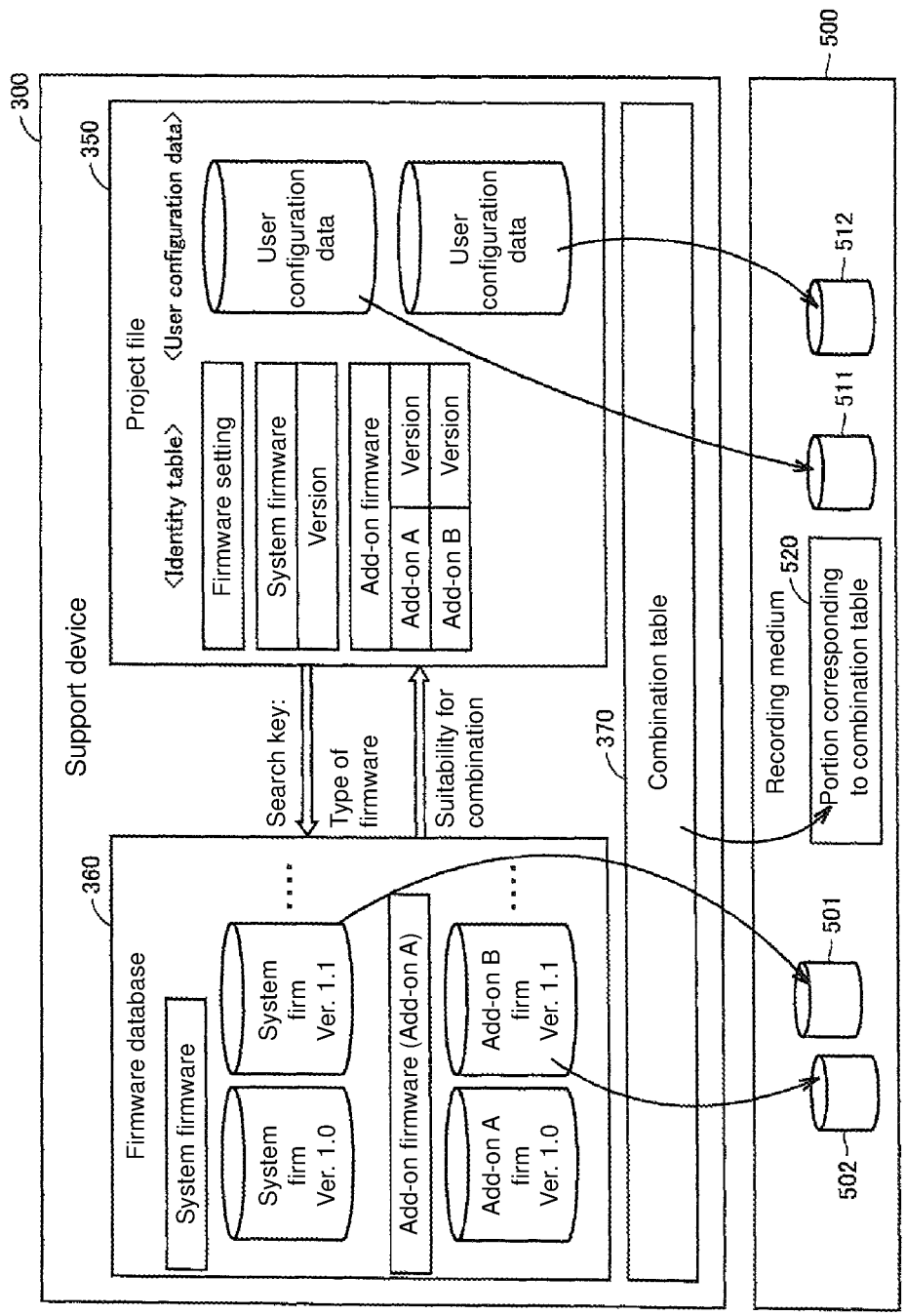
FIG. 6 is a schematic view illustrating an example functional configuration of a support device in a control system according to a first embodiment.

FIG. 6 is a schematic view illustrating an example functional configuration of the support device 300 in the control system according to the first embodiment. As shown in FIG. 6, the support device 300 stores a project file 350, a firmware database 360, and a combination table 370.

The project file 350 is an example data group for operating the control device, and includes a user program (system firmware and add-on firmware described later) and data (user configuration data) representing a system configuration. More specifically, the project file 350 includes information identifying system firmware and add-on firmware to be executed by the PLC 100, and user configuration data for use in setting the system firmware and the add-on firmware. The project file 350 is stored in, for example, the HDD 308.

The firmware database 360 stores firmware data for the control device, and its license. The firmware database 360 identifies firmware in accordance with a type specified in the project file 350. A type of firmware includes a large classification regarding the firmware (system firmware, add-on firmware, . . . ) and a classification based on a version (Ver. 1.0, Ver. 1.1, . . . ). The firmware database 360 is achieved with, for example, the HDD 308 for storing the firmware and the CPU 302 for executing a search for the stored firmware.

The combination table 370 stores information on a combination of data stored in the firmware database 360. For example, the combination table 370 includes information identifying, per a type of system firmware, a type of add-on firmware normally operating on the system firmware. The combination table 370 is stored in, for example, the HDD 308. In addition, the combination table 370 includes information identifying, per a type of system firmware, a type of user configuration data available in setting the system firmware. Further, the combination table 370 includes information identifying, per a type of add-on firmware, a type of user configuration data available in setting the add-on firmware.

<Combination Table>

Figures 7, 8:
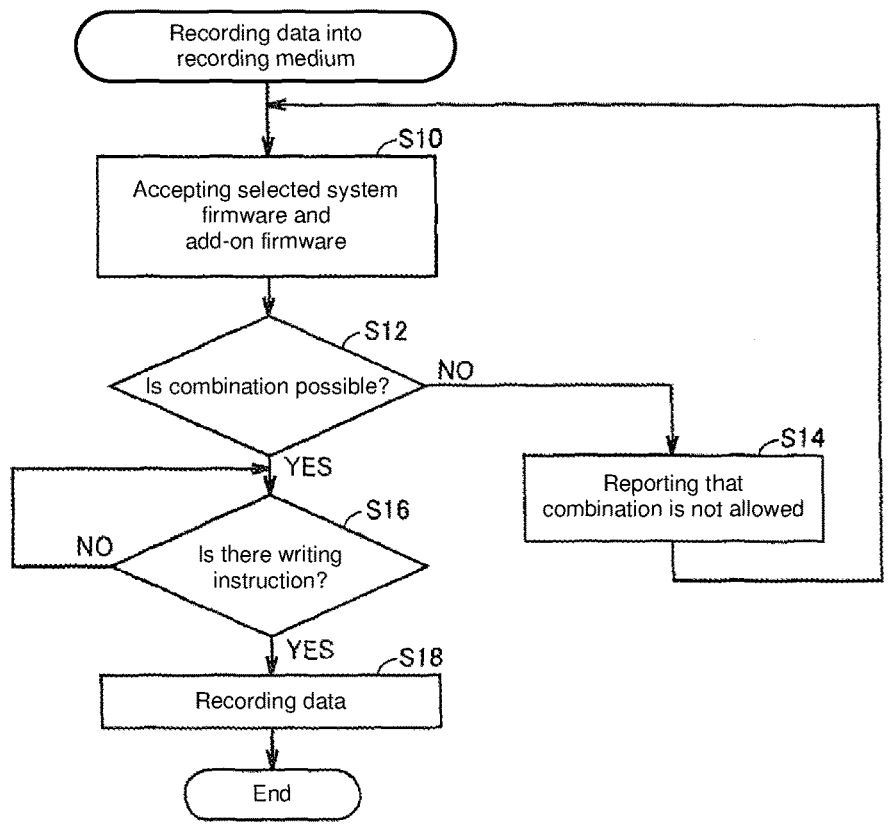
FIG. 7 is a view illustrating an example of information included in a combination table according to the first embodiment.
FIG. 8 is a flow chart of an example process executed by the support device.

FIG. 7 is a view illustrating an example of information included in the combination table 370 according to the first embodiment. As shown in FIG. 7, the combination table 370 includes information specifying, per a version of system firmware, a type of add-on firmware available (that normally operates) on the system firmware of the version. The type specified in here identifies a title and a version of the add-on firmware. That is, in the combination table 370, even if a common title is used, a plurality of add-on firmware with different versions is identified as that the plurality of add-on firmware is different each other. A version of system firmware and a version of add-on firmware can be identified by, for example, a file name of each firmware program.

For example, in the combination table 370, system firmware with a version "V1.0" is associated with information of "Add-on_A V1.0." This means that an add-on firmware program with a type "Add-on_A" and a version "V1.0" normally operates on system firmware with a version "V1.0."

In addition, in the combination table 370, system firmware with a version "V1.1" is associated with information of "Add-on_A V1.0" and information of "Add-on_B V1.0." This means that an add-on firmware program with a type "Add-on_A" and a version "V1.0" and an add-on firmware program with a type "Add-on_B" and a version "V1.0" normally operate on system firmware with a version "V1.1."

In the support device 300, a table shown in FIG. 7 is stored in, for example, the HDD 308. At this point, information identifying the above described combination can also be stored in any other known formats (for example, formulas and other equations) than a table format.

In the control system according to the first embodiment, the support device 300 stores, in the recording medium 500, a combination of system firmware and add-on firmware specified in a combination table. More specifically, software for creating a project file (for example, an application for creating a project file) is installed in the support device 300. For such an application, system firmware is set first. Next, the application is specified with add-on firmware. However, the application accepts only add-on firmware that can normally operate on the already specified system firmware. That is, after the system firmware is set, the above described application is specified with only add-on firmware that can normally operate on the system firmware set in the above described table, or an error report will be issued or another action will be taken if the application is specified with other add-on firmware.

Accordingly, a combination of system firmware and add-on firmware can be specified in a project file in accordance with a rule based on a combination table. The above described application stores, in the recording medium 500, the system firmware and the add-on firmware specified in the project file. Therefore, the combination of the system firmware and the add-on firmware stored in the recording medium 500 according to the embodiment can normally operate.

<Recording Data into Recording Medium>

FIG. 8 is a flow chart of an example process executed by the support device 300. The process causes the support device 300 to record, into the recording medium 500, firmware in the firmware database 360. The process is achieved when the CPU 302 executes a predetermined program (for example, the above described application for creating a project file).

With reference to FIG. 8, in a step S10, the CPU 302 accepts a selected type of system firmware and a selected type of add-on firmware.

In a step S12, the CPU 302 determines, in accordance with the combination table 370, if a combination of the system firmware and the add-on firmware specified and accepted in the step S10 is a possible combination. Next, after the CPU 302 determines that the combination is possible, the CPU 302 allows a control to proceed to a step S16 (YES in the step S12). When the CPU 302 determines that the combination is not possible (for example, the combination does not conform to the combination table 370), the CPU 302 causes the control to proceed to a step S14 (NO in the step S12).

In a step S14, the CPU 302 reports that the selected combination is not permitted, and returns the control to the step S10. The report is achieved with, for example, a message shown on the monitor 314, indicating that the combination is not permitted.

In a step S16, the CPU 302 determines if an instruction on writing into the recording medium 500 is input. Until the CPU 302 determines that such an instruction is input, the CPU 302 stands by in the step S16 for instruction (NO in the step S16). Next, upon the CPU 302 determines that such an instruction is input, the CPU 302 allows the control to proceed to a step S18 (YES in the step S16).

In the step S18, the CPU 302 records, into the recording medium 500, the specified system firmware and the add-on firmware, and ends the process.

As a result of the above described process in FIG. 8, the combination of the system firmware and the add-on firmware written into the recording medium 500 conforms to the combination table 370.

Accordingly, an operator can use the recording medium 500 to write firmware into the PLC 100 without taking into account the combination of the two types of firmware recorded in the recording medium 500.

[Second Embodiment]

In a control system according to a second embodiment, the support device 300 records, into the recording medium 500, the above described combination table, in addition to configuration data. A configuration of the control system will now be described herein.

<Combination Table>

In the control system according to the second embodiment, the combination table 370 shown in FIG. 6 includes information identifying a combination on user configuration data. More specifically, the combination table 370 includes information identifying a combination of the user configuration data and system firmware, and information identifying a combination of the user configuration data and add-on firmware.

FIG. 9 is a schematic view illustrating an example of information identifying a combination of system firmware and user configuration data. As shown in FIG. 9, in the combination table 370, a version of the system firmware and a type of the user configuration data (version) that can be used for each system firmware are associated with. For example, system firmware with a version "V1.0" is associated with user configuration data with a version "User configuration data (System) for V1.0" and user configuration data with a version "User configuration data (System) for V1.1." A version of system firmware can be identified with, for example, a file name of each firmware program. In addition, a version of user configuration data can be identified with, for example, a file name of the data.

FIG. 10 is a schematic view illustrating an example of information identifying a combination of add-on firmware and user configuration data. As shown in FIG. 10, in the combination table 370, a version of add-on firmware and a type of user configuration data (version) that can be used for each system firmware are associated with. FIG. 10 shows a relationship on a type "Add-on A," among a plurality of types of add-on firmware. For example, add-on firmware with a version "V1.0" for the Add-on A is associated with user configuration data with a version "User configuration data (Add-on_A) for V1.0." A version of add-on firmware can be identified with, for example, a file name of each firmware program.

<Recording Data into Recording Medium>

Figure 11:
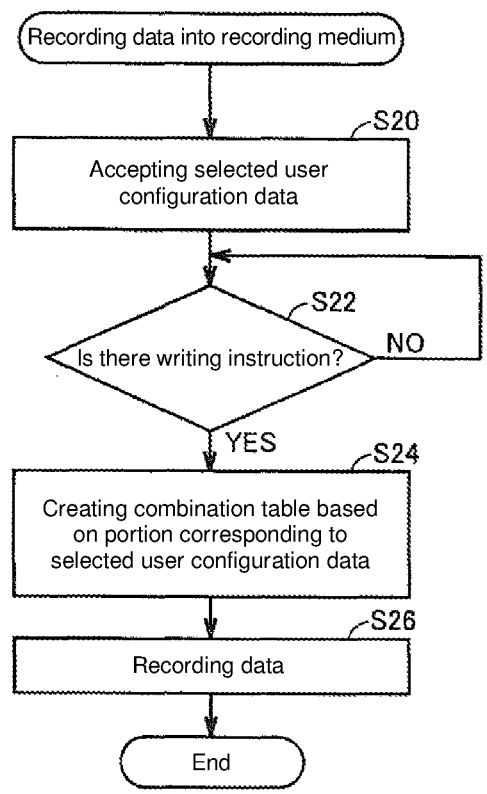
FIG. 11 is a flow chart of a process of recording user configuration data into a recording medium, executed in a support device according to a second embodiment.

FIG. 11 is a flow chart of a process of recording user configuration data into the recording medium 500, executed in the support device 300 according to the second embodiment.

With reference to FIG. 11, in a step S20, the CPU 302 accepts selected user configuration data.

In a step S22, the CPU 302 determines if an instruction on writing into the recording medium 500 is input. When the CPU 302 determines that such an instruction is not yet input, the CPU 302 stands by in a step S22 for instruction (NO in the step S22). Next, upon the CPU 302 determines that the instruction is input, the CPU 302 allows the control to proceed to a step S24 (YES in the step S22).

In the step S24, the CPU 302 creates, in the recording medium 500, a combination table corresponding to the user configuration data selected in the step S20.

A "corresponding combination table" means that the table includes a portion including the selected user configuration data in the combination table 370. More specifically, as shown in FIG. 9, for example, user configuration data with a version "User configuration data (System) for V1.0" is associated with system firmware with versions "V1.0," "V1.1," and "V1.2." Therefore, in the step S24, when the user configuration data with a version "User configuration data (System) for V1.0" is selected, portions including system firmware with versions "V1.0," "V1.1," and "V1.2" are extracted from the combination table 370 for creating a "corresponding combination table."

In addition, as shown in FIG. 10, the user configuration data with a version "User configuration data (Add-on_A) for V1.0" is associated with add-on firmware with versions "V1.0" and "V1.1" for the Add-on A. Therefore, when the user configuration data with the version "User configuration data (System) for V1.0" is selected, portions including the system firmware with the versions "V1.0," "V1.1," and "V1.2" are extracted from the combination table 370 for creating a "corresponding combination table."

Returning to FIG. 11, in a step S26, after the "corresponding combination table" is created in the step S24, the CPU 302 records, into the recording medium 500, the selected user configuration data, and the combination table created in the step S24, and ends the process.

In the above described process shown in FIG. 11, the CPU 302 records, into the recording medium 500, the selected user configuration data and the combination table corresponding to the user configuration data. At this point, the combination table recorded in the recording medium 500 should include at least a portion corresponding to the selected user configuration data. That is, in the step S26, for example, the combination table 370 may be entirely recorded in the recording medium 500.

<Writing Data into PLC>

Figure 12:
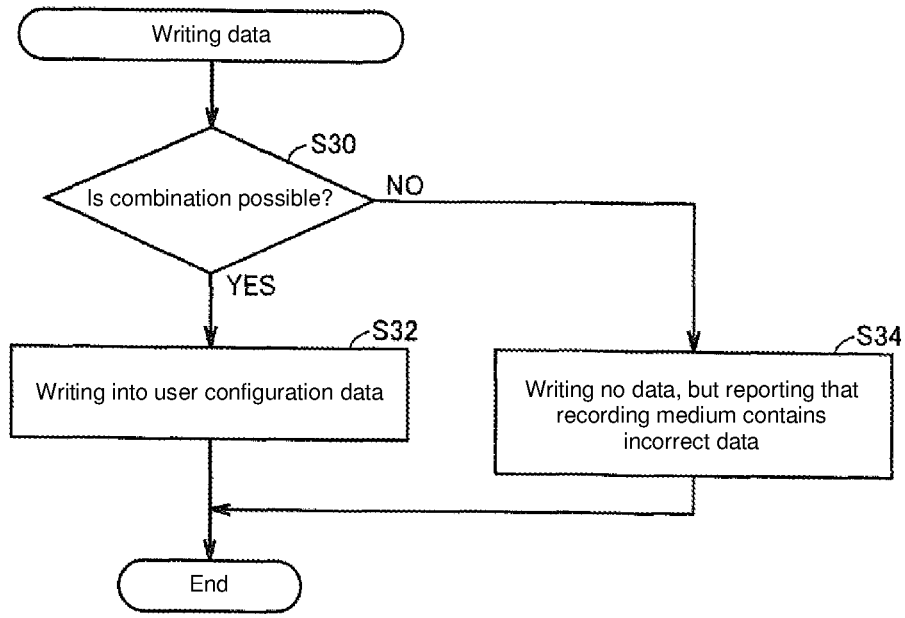
FIG. 12 is a flow chart of an example process of writing data into a PLC.

FIG. 12 is a flow chart of a process of writing data into the PLC using the recording medium 500 in which data is recorded through a process as shown in FIG. 11. The process shown in FIG. 12 is executed by the processor 122 of the PLC. With the recording medium 500 attached to the SD memory card interface 136, the processor 122 executes the process shown in FIG. 12.

With reference to FIG. 12, in a step S30, the processor 122 determines, in accordance with a content specified in the combination table recorded in the recording medium 500 (steps S24 and S26), if a combination of user configuration data stored in the recording medium 500 and system firmware or add-on firmware installed in the PLC 100 is suitable. More specifically, the processor 122 determines that the combination is suitable, when the system firmware or the add-on firmware installed in the PLC 100 is associated with, in the combination table, the user configuration data recorded in the recording medium 500. In addition, if no association is made, the processor determines that the combination is not suitable. Next, upon the processor 122 determines that the combination is suitable, the processor 122 allows a control to proceed to a step S32 (YES in the step S30). In addition, upon the processor 122 determines that the combination is not suitable, the processor 122 causes the control to proceed to a step S34 (NO in the step S30).

In the step S32, the processor 122 writes, into the non-volatile memory 126, the user configuration data recorded in the recording medium 500, and ends the process shown in FIG. 12.

In the step S34, the processor 122 does not execute writing as shown in the step S32, but reports that the data recorded in the recording medium 500 is not correct, and ends the process.

In the above described second embodiment, when the PLC 100 writes from the recording medium 500 the user configuration data, the combination is determined for suitability in accordance with the combination table stored in the recording medium 500. That is, an operator attending an operation of writing user configuration data is not required to have knowledge for determining if the combination of the user configuration data and the system firmware and/or the add-on firmware is suitable. Accordingly, the writing can be executed simply and promptly. At this point, for example, the operator attending the above described operation operates a switch to turn on power to the PLC 100, operates a switch to start the process shown in FIG. 12, and/or attaches the recording medium 500 to the PLC 100.

In addition, if the user configuration data in the recording medium 500 does not conform to the system firmware and/or the add-on firmware installed in the PLC 100, a report is issued in the step S34. Accordingly, wrong user configuration data can be prevented from being written into the PLC 100. In addition, even if a version of system firmware and/or add-on firmware is unintentionally changed in the PLC 100, a manager in a manufacturing site can easily find the change.

[Third Embodiment]

In a control system according to a third embodiment, the support device 300 records, into the recording medium 500, system firmware, add-on firmware, user configuration data, and a combination table. The PLC 100 writes data using the recording medium 500. A configuration of the control system according to the third embodiment will now be described herein.

<Recording Data into Recording Medium>

Figure 13:
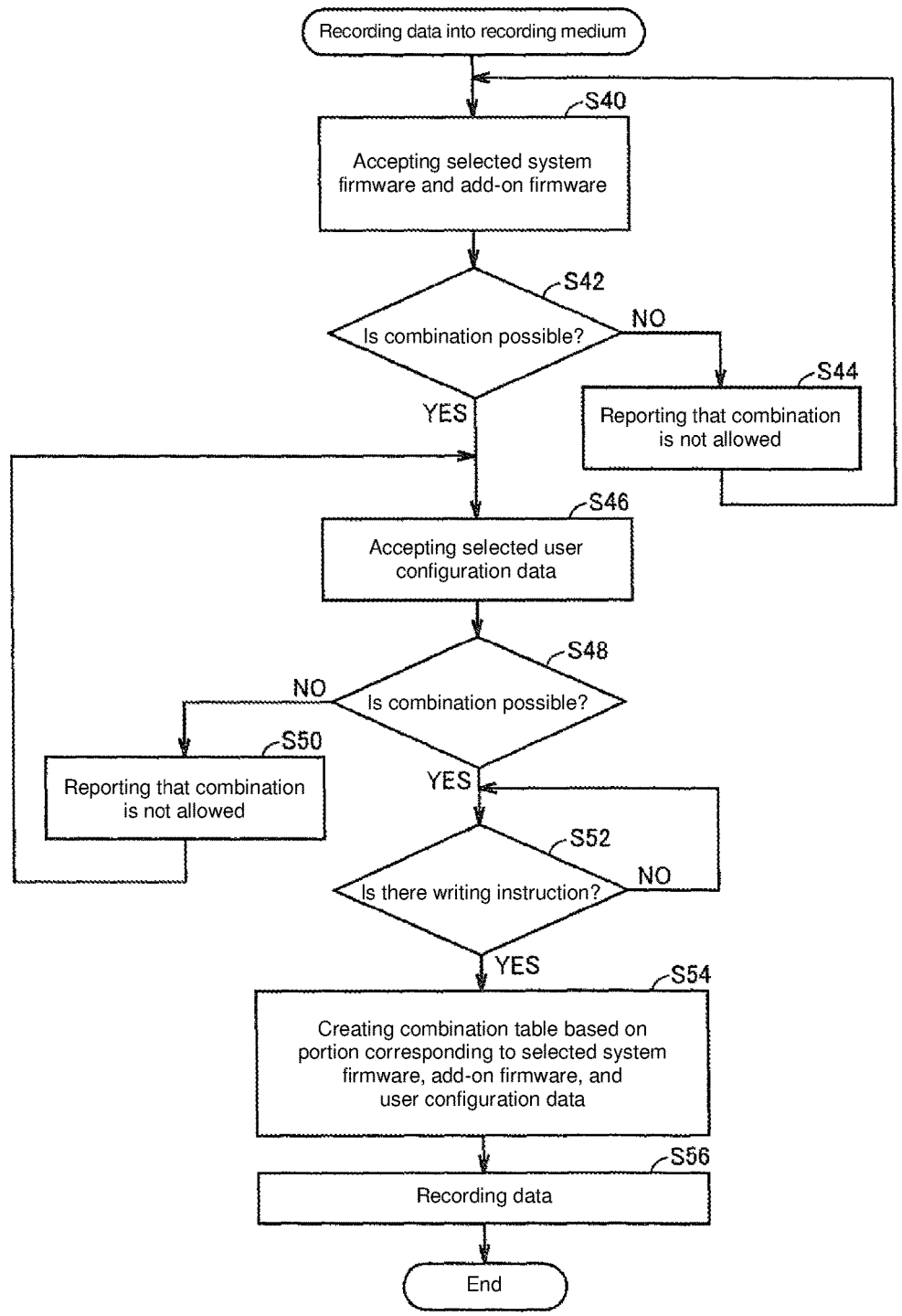
FIG. 13 is a flow chart of a process of recording data into a recording medium in a support device according to a third embodiment.

FIG. 13 is a flow chart of a process of recording data into the recording medium 500 in a support device 300 according to the third embodiment. With reference to FIG. 11, in a step S40, the CPU 302 accepts selected system firmware and add-on firmware.

In a step S42, the CPU 302 determines, in accordance with the content specified in the combination table 370 (see FIG. 7), if the combination selected in the step S40 is suitable. Next, upon the CPU 302 determines that the combination is suitable, the CPU 302 allows a control to proceed to a step S46 (YES in the step S42). In addition, upon the CPU 302 determines that the combination is not suitable, the CPU 302 causes the control to proceed to a step S44 (NO in the step S42).

In the step S44, the CPU 302 reports that the combination of the selected system firmware and the add-on firmware is not suitable, and returns the control to the step S40.

In the step S46, the CPU 302 accepts selected user configuration data. Next, the CPU 302 allows the control to proceed to a step S48.

In the step S48, the CPU 302 determines, in accordance with the content specified in the combination table 370 (see FIG. 9 or 10), if the user configuration data selected in the step S46 can suitably be combined with the system firmware or the add-on firmware selected in the step S40. Next, upon the CPU 302 determines that the combination is suitable, the CPU 302 allows the control to proceed to a step S52 (YES in the step S48). In addition, upon the CPU 302 determines that the combination is not suitable, the CPU 302 causes the control to proceed to a step S50 (NO in the step S48).

In the step S50, the CPU 302 report that the selected user configuration data cannot suitably be combined with the already selected system firmware and/or the add-on firmware, and returns the control to the step S46.

In the step S52, the CPU 302 determines if an instruction on writing into the recording medium 500 is input. When the CPU 302 determines that such an instruction is not yet input, the CPU 302 stands by in the step S52 for instruction (NO in the step S52). Next, upon the CPU 302 determines that the instruction is input, the CPU 302 allows the control to proceed to a step S54 (YES in the step S52).

In the step S54, the CPU 302 creates a combination table corresponding to the system firmware and the add-on firmware selected in the step S40 and the user configuration data selected in the step S46.

Creation of a combination table includes 1) creation of a combination table corresponding to selected system firmware, 2) creation of a combination table corresponding to selected add-on firmware, and 3) creation of a combination table corresponding to selected user configuration data.

1) The combination table corresponding to the selected system firmware is created, for example, through extraction of a portion including the selected system firmware from the combination table 370.

2) The combination table corresponding to the selected add-on firmware is created, for example, through extraction of a portion including the selected add-on firmware from the combination table 370.

3) The combination table corresponding to the selected user configuration data is created, for example, through extraction of a portion including the selected user configuration data from the combination table 370.

In a step S56, the CPU 302 records, into the recording medium 500, the system firmware and the add-on firmware selected in the step S40, the user configuration data selected in the step S46, and the combination table created in the step S54, and ends the process.

<Writing Data into PLC>

Figure 14:
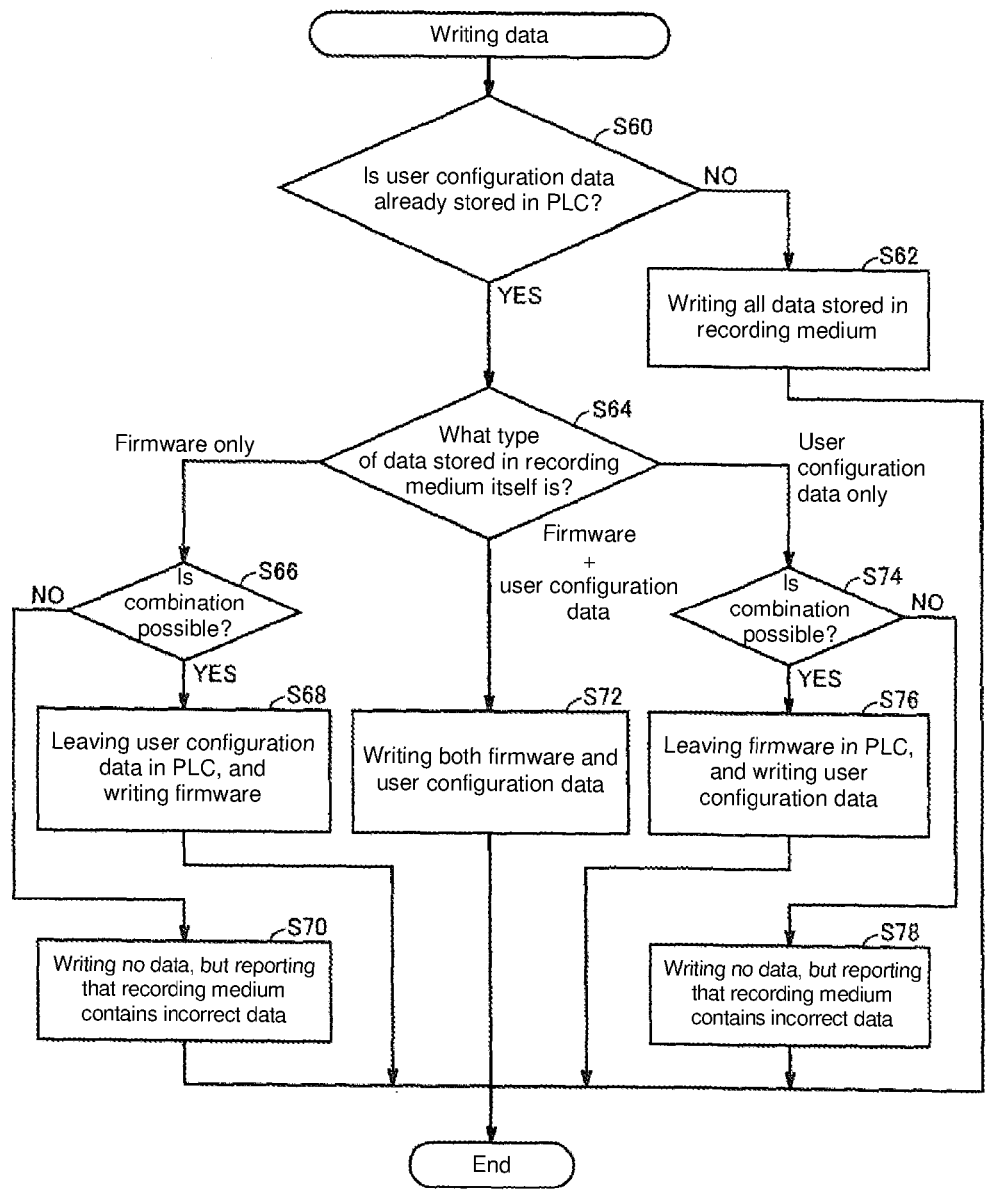
FIG. 14 is a flow chart of another example process of writing data into a PLC.

FIG. 14 is a flow chart of a process of writing data into the PLC 100 using the recording medium 500. With the recording medium 500 attached to the SD memory card interface 136, the processor 122 executes the process shown in FIG. 14.

With reference to FIG. 14, in a step S60, the processor 122 determines if the PLC 100 stores user configuration data. In the step S60, the processor 122 determines, for example, if the nonvolatile memory 126 stores a file having a file name including a predetermined character string for the user configuration data. Upon the processor 122 determines that the PLC 100 stores the user configuration data, the processor 122 allows a control to proceed to a step S64 (YES in the step S60). Upon the processor 122 determines that the PLC 100 does not store the user configuration data, the processor 122 causes the control to proceed to a step S62 (NO in the step S60).

In the step S62, the processor 122 writes, into the nonvolatile memory 126, all data stored in the recording medium 500, and ends the process shown in FIG. 14.

In the step S64, the processor 122 identifies a type of the data stored in the recording medium 500. Next, upon the processor 122 determines that only firmware (system firmware and add-on firmware) is stored, the processor 122 allows the control to proceed to a step S66. Upon the processor 122 determines that firmware (system firmware and add-on firmware) and user configuration data are stored, the processor 122 allows the control to proceed to a step S72. Upon the processor 122 determines that only user configuration data is stored, the processor 122 allows the control to proceed to a step S74.

In the step S66, the processor 122 determines, in accordance with a content of the combination table stored in the recording medium 500, if a combination of the user configuration data stored in the PLC 100 and the firmware (system firmware and add-on firmware) stored in the recording medium 500 is suitable. More specifically, the processor 122 extracts a portion including the system firmware in the recording medium 500 from the combination table in the recording medium 500 to determine if the extracted portion includes the user configuration data in the PLC 100. In addition, the processor 122 extracts a portion including the add-on firmware in the recording medium 500 from the combination table in the recording medium 500 to determine if the extracted portion includes the user configuration data in the PLC 100. A determination of "include" corresponds to a determination that the combination is suitable. A determination of "does not include" corresponds to a determination that the combination is not suitable.

Next, upon the processor 122 determines that the user configuration data in the PLC 100 is suitable for a combination with either of the system firmware and the add-on firmware in the recording medium 500, the processor 122 allows the control to proceed to a step S68 (YES in the step S66). Upon the processor 122 determines that the user configuration data in the PLC 100 cannot suitably be combined with both of the system firmware and the add-on firmware in the recording medium 500, the processor 122 causes the control to proceed to a step S70 (NO in the step S66).

In the step S68, with the user configuration data in the PLC 100 left behind, the processor 122 writes, into the nonvolatile memory 126, the firmware (system firmware and add-on firmware) stored in the recording medium 500, and ends the process shown in FIG. 14.

In the step S70, the processor 122 does not execute writing as shown in the step S68, but reports that the recording medium 500 contains incorrect data, and ends the process. The report causes, for example, the LED 128 to come on or blink.

In the step S72, the processor 122 writes, into the nonvolatile memory 126, the firmware (system firmware and add-on firmware) in the recording medium 500 and the user configuration data, and ends the process shown in FIG. 14.

In the step S74, the processor 122 determines, in accordance with the content in the combination table stored in the recording medium 500, if the combination of the firmware (system firmware and add-on firmware) installed in the PLC 100 and the user configuration data stored in the recording medium 500 is suitable. More specifically, the processor 122 extracts a portion including the user configuration data in the recording medium 500 from the combination table in the recording medium 500 to determine if the extracted portion includes the system firmware or the add-on firmware in the PLC 100. A determination of "include" corresponds to a determination that the combination is suitable. A determination of "does not include" corresponds to a determination that the combination is not suitable.

Next, upon the processor 122 determines that the user configuration data in the recording medium 500 is suitable for a combination with the system firmware or the add-on firmware in the PLC 100, the processor 122 allows the control to proceed to a step S76 (YES in the step S74). Upon the processor 122 determines that the user configuration data in the recording medium 500 cannot suitably be combined with both of the system firmware and the add-on firmware in the PLC 100, the processor 122 causes the control to proceed to a step S78 (NO in the step S74).

In the step S76, with the system firmware or the add-on firmware installed in the PLC 100 left behind, the processor 122 writes, into the nonvolatile memory 126, the user configuration data in the recording medium 500, and ends the process shown in FIG. 14.

In the step S78, the processor 122 does not execute writing as shown in the step S76, but reports that the recording medium 500 contains incorrect data, and ends the process. The report causes, for example, the LED 128 to come on or blink.

In the above described third embodiment, the PLC 100 determines, in accordance with the combination table stored in the recording medium 500, if data recorded in the recording medium 500 can be written.

More specifically, when the PLC 100 writes the user configuration data from the recording medium 500, as shown in the steps S74 to S78, the combination of the user configuration data and the firmware already stored in the PLC 100 is determined for suitability in accordance with the combination table stored in the recording medium 500. That is, an operator attending a writing operation is not required to have knowledge for determining if the combination of the user configuration data and the system firmware and/or the add-on firmware is suitable. Accordingly, data can be simply and promptly written into the PLC 100.

In addition, when the PLC 100 writes firmware (system firmware and/or add-on firmware) from the recording medium 500, as shown in the steps S66 to S70, the combination of the firmware and the user configuration data already stored in the PLC 100 is determined for suitability in accordance with the combination table stored in the recording medium 500. That is, an operator attending a writing operation is not required to have knowledge for determining if the combination of the user configuration data already stored in the PLC 100 and the system firmware and the add-on firmware to be written is suitable. Accordingly, data can be simply and promptly written into the PLC 100.

In addition, according to the embodiment, if system firmware, add-on firmware, and/or user configuration data in the PLC 100 cannot be suitability combined with firmware or user configuration data that is desired to be written, due to that a version or other information of the system firmware, the add-on firmware, and/or the user configuration data in the PLC 100 is(are) unintentionally changed by other than manager in a manufacturing site, a report on an unsuitable combination is issued (steps S70 and S78). Accordingly, such a change can easily be found.

At this point, the writing process shown in FIG. 14 is applicable to a process using other recording medium in which data is recorded in accordance with the process shown in FIG. 13, than the recording medium 500.

[Fourth Embodiment]

A support device 300 according to a fourth embodiment records, into the recording medium 500, system firmware, add-on firmware, and user configuration data. The system firmware, the add-on firmware, and the user configuration data configure a suitable combination that conform to the combination table 370. The system firmware, the add-on firmware, and the user configuration data in such a combination are written as they are in, for example, a new PLC 100.

Figure 15:
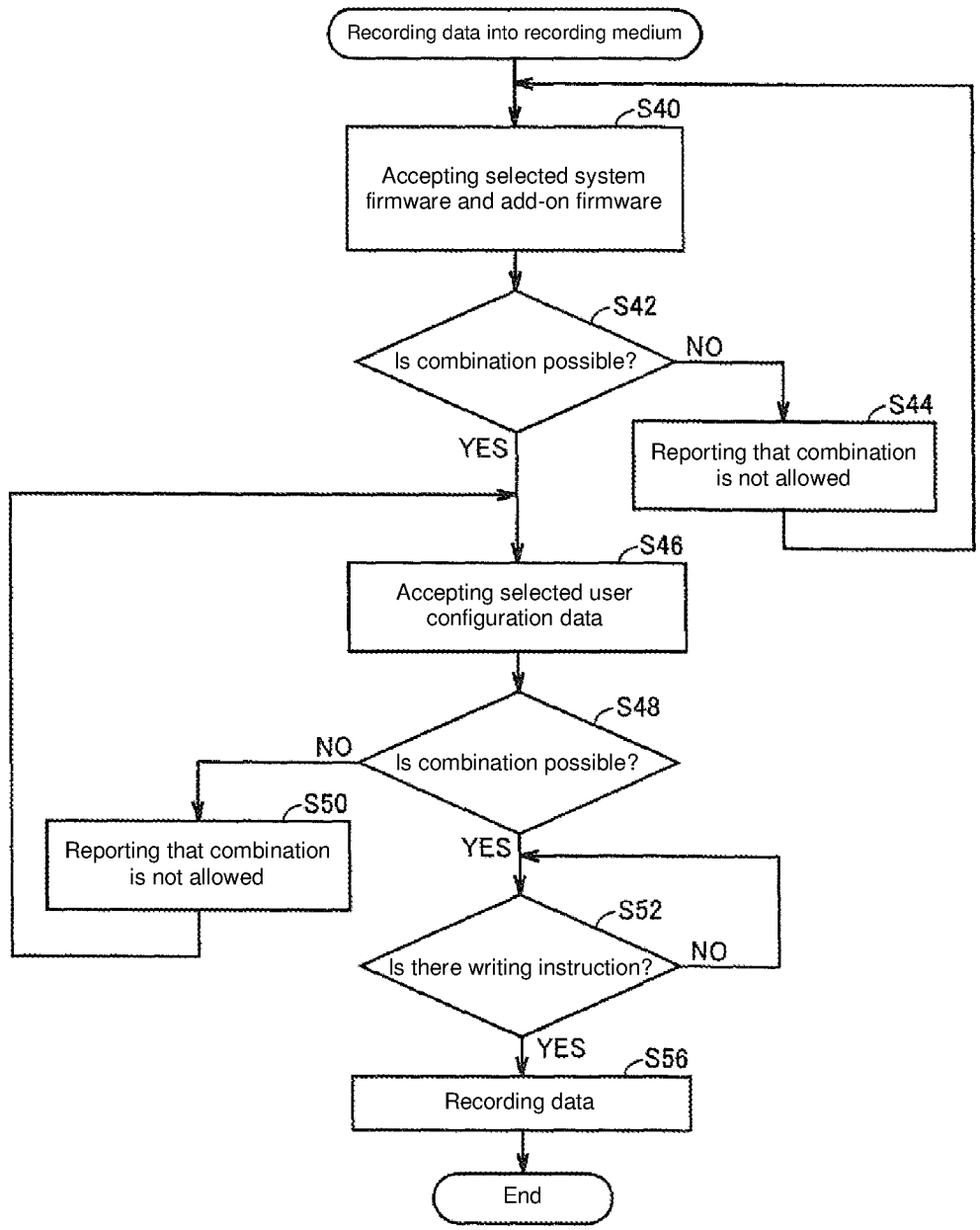
FIG. 15 is a flow chart of a process of recording data into a recording medium, executed in a support device according to a fourth embodiment.

FIG. 15 is a flow chart of a process of recording data into the recording medium 500, executed in the support device 300 according to the fourth embodiment.

Comparing with the process shown in FIG. 13, the process shown in FIG. 15 does not create a combination table, which can be seen in the step S54. In addition, in a step S56 in the process shown in FIG. 15, the CPU 302 records, into the recording medium 500, system firmware and add-on firmware selected in a step S40 and user configuration data selected in a step S46.

In a control system according to the fourth embodiment, the PLC 100 writes all the data (system firmware, add-on firmware, and user configuration data) recorded, by the support device 300, in the recording medium 500. The data conforms to a combination specified as suitable in the combination table 370. Therefore, an operator attending the writing into the PLC 100 is not required to have special knowledge on a combination of the data. Therefore, data can be simply and promptly written in the PLC 100.

The embodiments disclosed in this time are intended for illustrative purposes only in all respects, and should not be construed as restrictive. The scope of the present invention is indicated by the claims, not the above description, and intends to include all modifications and alterations within the scope of the claims and equivalent meanings and ranges.

DESCRIPTION OF SYMBOLS

1 Control system
100 PLC
122 Processor
124 Main memory
126 Nonvolatile memory
132 Input device
134 Connector
136,316 SD memory card interface
300 Support device
308 Hard disk
310 Keyboard
312 Mouse
314 Monitor
500 Recording medium

The invention claimed is:
1. A control device comprising:
a reader reading from a portable recording medium, the portable recording medium storing:
an item of a first data type to be written to the control device, and
a combination table that specifies permitted combinations of one or more of a plurality of items of the first data type and one or more of a plurality of items of a second data type, wherein
the permitted combinations comprise permitted combinations of firmware and configuration data for operation of the control device, and the configuration data comprises data for changing a setting of the control device and for customizing the firmware;

a storage device storing at least one item of the second data type; and a processor configured with a program to perform operations comprising:

automatically determining, based on the combination table, that a combination of the item of the first data type to be written and the at least one item of the second data type conforms with at least one of the permitted combinations in the combination table, writing, into the storage device from the portable recording medium, the item of the first data type when it is determined that the combination of the item of the first data type and the at least one item of the second data type conforms with at least one of the permitted combinations in the combination table, and not writing, into the storage device from the portable recording medium, the item of the first data type when it is determined that the combination of the item of the first data type to be written and the at least one item of the second data type does not conform with at least one of the permitted combinations in the combination table.

2. The control device according to claim 1, wherein the at least one item of the second data type stored in the storage device comprises firmware and the item of the first data type to be written comprises configuration data.

3. The control device according to claim 1, wherein the at least one item of the second data type stored in the storage device comprises configuration data.

4. The control device according to claim 1, the processor further configured with the program to perform operations comprising operation as a reporting unit for executing a reporting operation when it is determined that the combination of the item of the first data type and the at least one item of the second data type does not conform with at least one of the permitted combinations in the combination table.

5. A control system comprising:

a control device comprising:

a reader reading from a portable recording medium, the portable recording medium storing:

an item of a first data type to be written to the control device, and a combination table that specifies permitted combinations of one or more of a plurality of items of the first data type and one or more of a plurality of items of a second data type that result in normal operation of the control device, wherein the permitted combinations comprise permitted combinations of firmware and configuration data, and the configuration data comprises data for changing a setting of the control device and for customizing the firmware;

a storage device storing at least one item of the second data type; and a processor configured with a program to perform operations comprising:

automatically determining, based on the combination table, that a combination of the item of the first data type to be written and the at least one item of the second data type conforms with at least one of the permitted combinations in the combination table, writing, into the storage device from the portable recording medium, the item of the first data type when it is determined that the combination of the item of the first data type and the at least one item of the second data type conforms with at least one of the permitted combinations in the combination table, and not writing, into the storage device from the portable recording medium, the item of the first data type when it is determined that the combination of the item of the first data type to be written and the at least one item of the second data type does not conform with at least one of the permitted combinations in the combination table; and a support device for writing to the portable recording medium comprising a processor configured with a program to perform operations comprising:

operation as a recorder configured to write the item of the first data type and the combination table into the portable recording medium.

6. The control system according to claim 5, wherein the at least one item of the second data type stored in the storage device comprises firmware and the item of the first data type to be written comprises configuration data.

7. The control system according to claim 5, wherein the at least one item of the second data type stored in the storage device comprises configuration data.

8. The control system according to claim 5, wherein the processor of the control device is further configured with the program to perform operations comprising operation as a reporting unit for executing a reporting operation when it is determined that the combination of the item of the first data type and the at least one item of the second data type does not conform with at least one of the permitted combinations in the combination table.

9. A control method for a control device, the control method being executed by a processor of the control device, the control device further comprising: a reader reading from a portable recording medium, the portable recording medium storing: an item of a first data type to be written to the control device, and a combination table that specifies permitted combinations of one or more of a plurality of items of the first data type and one or more of a plurality of items of a second data type that result in normal operation of the control device, wherein the permitted combinations comprise permitted combinations of firmware and configuration data, and the configuration data comprises data for changing a setting of the control device and for customizing the firmware; and a storage device storing at least one item of the second data type, the control method comprising:

automatically determining, by the processor based on the combination table, that a combination of the item of the first data type to be written and the at least one item of the second data type conforms with at least one of the permitted combinations in the combination table;

writing, by the processor into the storage device from the portable recording medium, the item of the first data type when it is determined that the combination of the item of the first data type and the at least one item of the second data type conforms with at least one of the permitted combinations in the combination table; and not writing, by the processor into the storage device from the portable recording medium, the item of the first data type when it is determined that the combination of the item of the first data type to be written and the at least one item of the second data type does not conform with at least one of the permitted combinations in the combination table.

10. The control method according to claim 9, further comprising executing, by the processor, a report when it is determined that the combination of the item of the first data type to be written and the at least one item of the second data type does not conform with at least one of the permitted combinations in the combination table.

11. A control method for a control system, the control system comprising:
a control device comprising: a first processor; and
a reader reading from a portable recording medium, the portable recording medium storing:
an item of a first data type to be written to the control device, and
a combination table that specifies permitted combinations of one or more of a plurality of items of the first data type and one or more of a plurality of items of a second data type that result in normal operation of the control device,
wherein
the permitted combinations comprise permitted combinations of firmware and configuration data, and the configuration data comprises data for changing a setting of the control device and for customizing the firmware; and
a storage device storing at least one item of the second data type; and
a support device comprising a second processor configured with a program to perform operations comprising operation as a recorder configured to write the item of the first data type and the combination table to the portable recording medium, the control method comprising:
writing, by the second processor of the support device, the item of the first data type to be written and the combination table to the portable recording medium;
reading, from the reader, the item of the first data type and the combination table;
automatically determining, by the first processor, based on the combination table, that a combination of the item of the first data type to be written and the at least one item of the second data type conforms with at least one of the permitted combinations in the combination table;
writing, by the first processor into the storage device from the portable recording medium, the item of the first data type when it is determined that the combination of the item of the first data type and the at least one item of the second data type conforms with at least one of the permitted combinations in the combination table; and
not writing, by the first processor into the storage device from the portable recording medium, the item of the first data type when it is determined that the combination of the item of the first data type to be written and the at least one item of the second data type does not conform with at least one of the permitted combinations in the combination table.

12. The control method according to claim 11, further comprising executing, by the first processor, a report when it is determined that the combination of the item of the first data type to be written and the at least one item of the second data type does not conform with at least one of the permitted combinations in the combination table.

13. The control method according to claim 9, wherein the at least one item of the second data type stored in the storage device comprises configuration data.

14. The control method for the control system according to claim 11, wherein the at least one item of the second data type stored in the storage device comprises configuration data.

15. The control method according to claim 9, wherein the at least one item of the second data type stored in the storage device comprises firmware and the item of the first data type to be written comprises configuration data.

16. The control method according to claim 11, wherein the at least one item of the second data type stored in the storage device comprises firmware and the item of the first data type to be written comprises configuration data.

* * * * *